Sept. 6, 1949. A. W. SEVERIN ET AL 2,481,251
MANURE LOADER
Filed Aug. 1, 1947 2 Sheets-Sheet 1
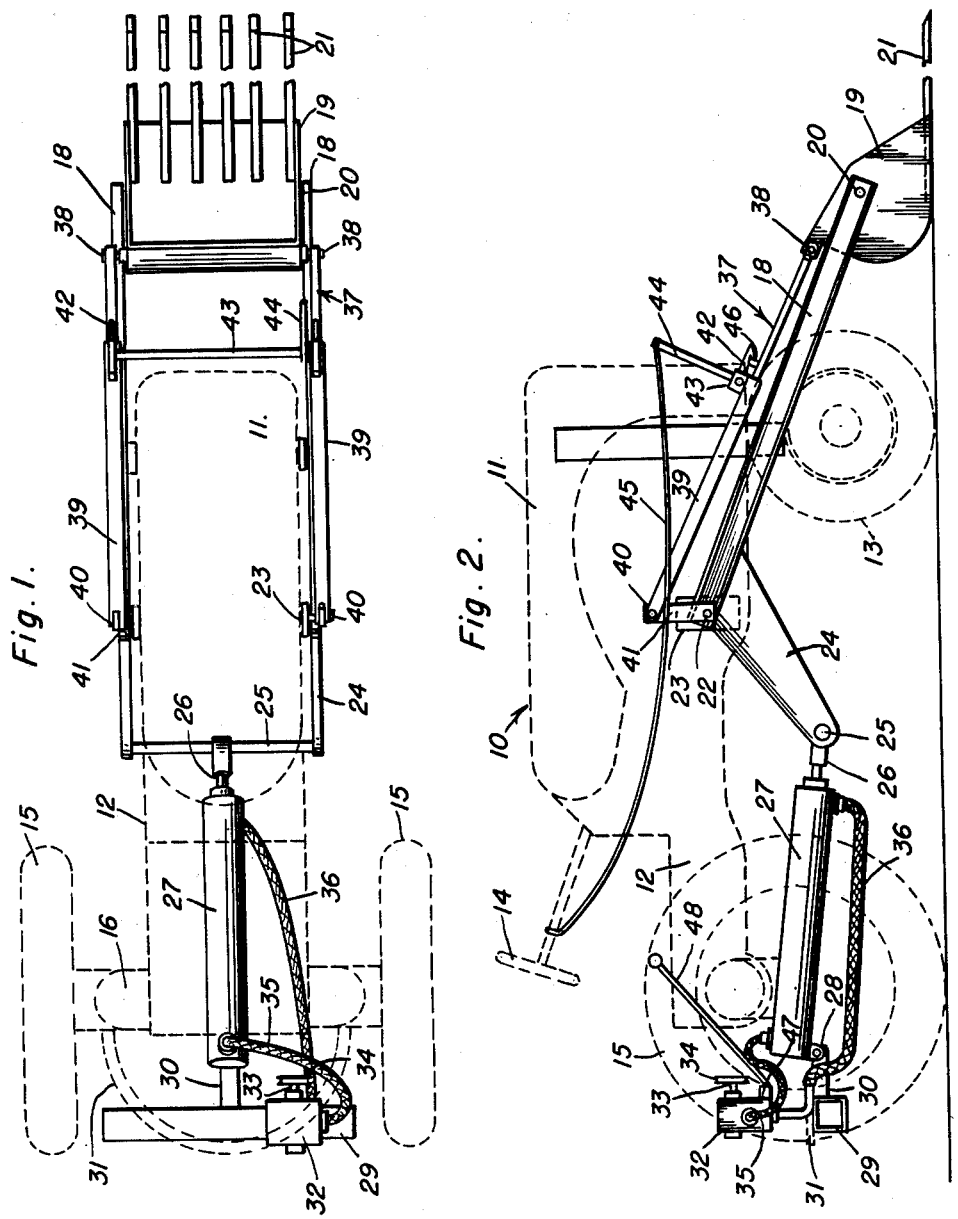
Inventor
Alyerd W. Severin
Marvin H. Feldman Sept. 6, 1949. A. W. SEVERIN ET AL 2,481,251
MANURE LOADER
Filed Aug. 1, 1947 2 Sheets-Sheet 2

Inventor
Alyerd W. Severin
Marvin H. Feldman

By *Clarence A. O'Brien
and Harvey B. Jacobson*
Attorneys

Patented Sept. 6, 1949

2,481,251

UNITED STATES PATENT OFFICE 2,481,251

MANURE LOADER

Alyerd W. Severin, Sheboygan Falls, and Marvin H. Feldmann, Plymouth, Wis.

Application August 1, 1947, Serial No. 765,310

1 Claim. (Cl. 214—140)

This invention relates to manure loaders, and more particularly to a device adapted to be built on or attached to a tractor, and the object thereof is to provide a manure loader with a hydraulic lift under the tractor and so mounted that the lift pressure is against the back draw bar and the center mountings under the tractor balance the load so that the lift is over all the length of the tractor and does not cause the rear end to lift or raise by being overbalanced when operating the loader, in addition to permitting the loader when in production, to fit tractors from big to small, with either narrow or wide front ends or buckets, plus the fact that it will work fast, giving expeditious and efficient operation and capable of being assembled and dismantled in a short period from fifteen to twenty-five minutes.

Another object of the invention is to provide a manure loader which is operated from the power take-off of a tractor, being pulley driven and being provided with a pump to supply a hydraulic fluid to a power cylinder to operate a reciprocating piston therein, to raise and lower the bucket of the loader, to move under or penetrate the manure or other material being loaded, and to then raise the same to a suitable position for dumping the load into a wagon or manure spreader and for holding the bucket in a loaded position and for releasing the same to dump the load, the parts being so arranged that the weight thereof including the load is distributed throughout the tractor frame or chassis and especially at the back thereof to cause downward pressure on the draw bar of the tractor and maintain the tractor wheels against the ground to give proper traction in propelling, loading and dumping the manure or the like.

A still further object of the invention is to provide a manure loader which includes pivoted arms mounted on the sides of the tractor frame and pivotally supporting the bucket at the front, while said arms are provided at the rear with depending acute angled arms connected with the piston rod of the power device or hydraulic cylinder so as to be operated thereby by pressure from the pump driven from the take-off power device of the tractor so as to engage the manure or other material to be loaded and to raise and lower the bucket and arms thereof or raising the load and dumping the same.

Another object of the invention is to provide a device which is of relatively simple construction, inexpensive and can be easily mounted on a tractor or dismounted therefrom, and which is simple to operate, efficient in use, strong and durable.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view of the manure loader mounted on a tractor.

Figure 2 is a side elevation of the structure shown in Figure 1.

Figure 3:
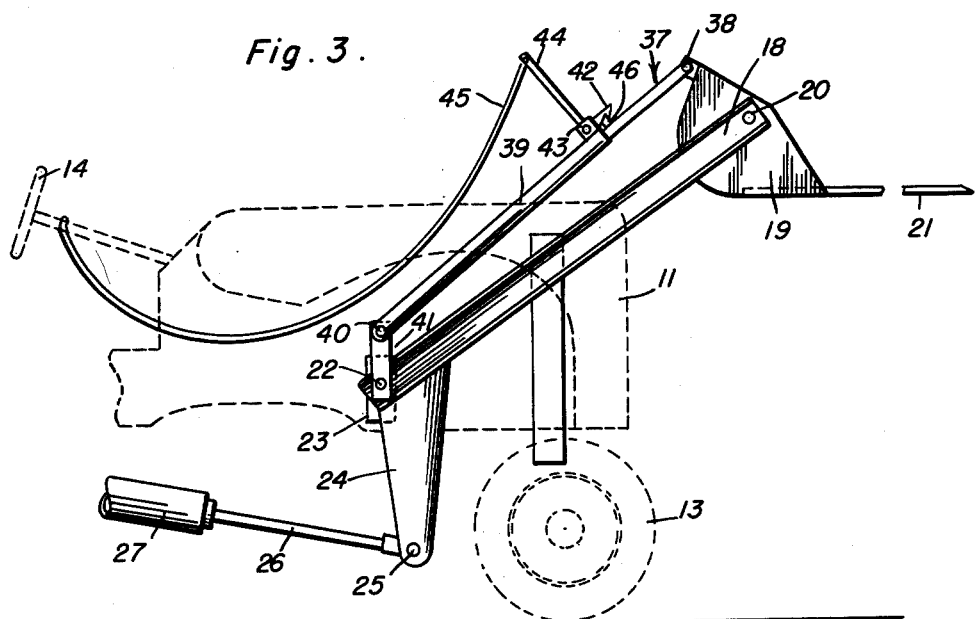
Figure 3 is a fragmentary side elevation showing the bucket raised as distinguished from the engaging or loading position shown in Figures 1 and 2.

Referring to the drawings in detail, in which like reference characters designate corresponding parts throughout the several views, the numeral 10 designates a suitable tractor of the agricultural or farm type having the usual hood 11 housing the motor and radiator of the circulating cooling system and including a chassis or frame 12. 13 designates the front steering wheels operated from the steering wheel 14 while 15 designates the rear and large tractor wheels by which the device is propelled and driven from the motor through the usual differential and transmission, including the rear axle housing 16 which houses the differential and is provided with the rear axle housing including the take-off power device 17.

The loader proper includes a pair of channel bars or irons forming arms 18 which are relatively long, and pivotally mount a bucket 19 at the sides thereof by pivotal connection therewith as indicated at 20 at the forward ends of the arms 18 The bucket is provided with the usual teeth 21 at the front so as to engage the manure or other material to load the bucket. The arms 18 are pivotally mounted on the bearings or pivots 22 at the rear ends thereof, carried by plates 23 attached to the sides of the tractor frame or chassis and are provided at said pivoted ends with downwardly and rearwardly inclined rigid tapered arms 24 extending at obtuse angles relative to the lengths of the arms 18 to a point centrally beneath the tractor frame between the front steering wheels 13 and the rear drive wheels 15 and connected transversely by a rod or bar 25, which is pivoted at the rear ends of the arms 24. At this point, a piston rod 26 which operates with its piston within an elongated hydraulic or other cylinder 27 centrally and longitudinally beneath the tractor frame and rear axle housing and differential, is connected to the shaft or bar 25.

The rear end of the cylinder 27 is pivotally mounted at 28 on the channel or draw bar support 29 through the medium of a forward extension 30, the channel or bar 29 serving to support the draw bar 31 usually of semi-circular form as shown in Figure 1 of the drawings. Arms 18 ride up and down against vertical guide bars 18' rigid at the sides of the frame 12 and hood 11.

From the power take-off 17, a pump 32, preferably a hydraulic oil pump or an air pump, is driven at its shaft 33 through the medium of a suitable gear drive or drive connection such as a belt and pulley 34 arranged on each shaft, including the power take-off and the shaft 33 of the pump which is provided with a pipe connection 35 leading to the rear top of the cylinder 27, and a pipe 36 leading to the front and bottom of the cylinder 27 so as to supply the fluid under pressure at either end for forcing the piston and piston rod 26 thereof forwardly or retracting the same to raise and lower the bucket.

Figure 4:
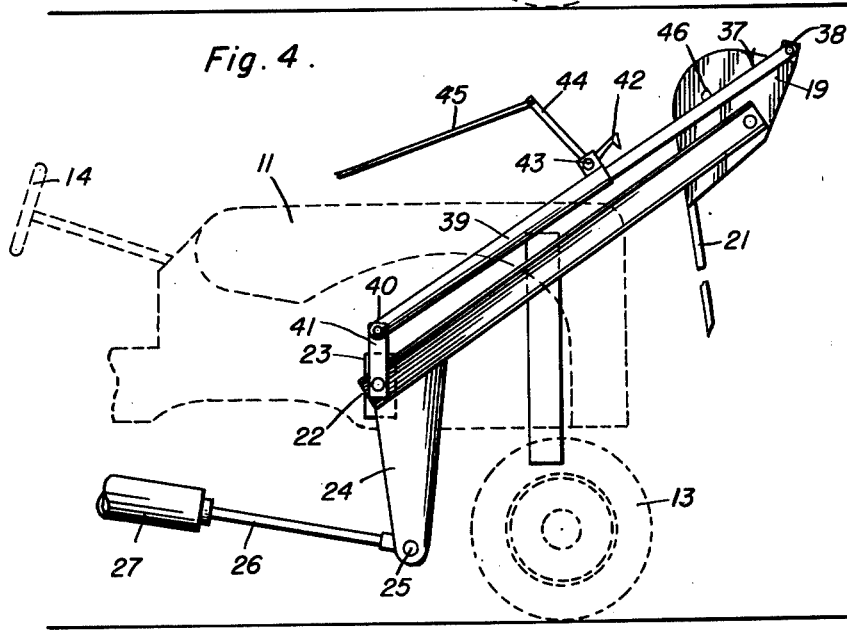
Figure 4 is a view showing the bucket tripped for discharging the load or dumping the same.

Attached to the top of the bucket, are telescopic arms or links 37 pivotally connected to brackets 38 at the top corners of the bucket at each side, as indicated at 38 and sliding within tubular sections 39 thereof pivotally connected as at 40 to arms or links 41 in turn pivoted at the pivots 22 of the arms 18. Catches 42 are pivoted at 43 on each side of the forward ends of the tubular sections 39 and indicated at 43 and connected by said pivot in the form of a transverse shaft as seen in Figures 1 and 2, one of which is provided with a trip lever 44 extending upwardly and adapted to be operated from a cord or cable 45 by the operator in the driver's seat on the tractor. The slidable sections 37 of the telescopic arms are provided with projections 46 which are designed to engage beneath the latches or keepers 42, to hold the bucket in a position when lowered to engage the manure or other material to be loaded therein and adapted when the piston and piston rod 26 of the hydraulic cylinder or plunger 27 is moved forwardly, to maintain the bucket in the loaded position when elevated by swinging the arms 24 downwardly and forwardly, while permitting pivotal action of the cylinder 27 to compensate for such movement in an arc, and to raise the arms 18 in the manner shown in Figure 3 of the drawings while the latch is held engaged. This is made possible by reason of the links or arms 37 in their telescopic relation when held, by reason of the pivotal action of the bucket on the pivots 20 of the arms 18 and of the arms on the pivots 22 at the back together with the arms 24, the links or connections 37 causing pivotal movement of the arms 41 so that when the bucket is swung up and down, it will remain in the same position as clearly shown in connection with Figures 2 and 3 of the drawings. However, when it is desired to dump or release the load, the operator merely pulls on the cable 45 to release the catches 42 as shown in Figure 4 of the drawings, thereby permitting the bucket to dump its load at the desired point or elevation into a wagon or a manure spreader, or in cleaning out a barn, to dump the same into the usual compost pile. The extension of the piston 26 from the loading position shown in Figure 2 is clearly shown in Figures 3 and 4 of the drawings. Thus, it will be seen that by mounting the arms 18 on the sides of the chassis somewhat in rear of the front thereof and front steering wheels 13 and the pivotal connection of the arms 24 extending downwardly and rearwardly from the arms 18 which carry the bucket 19 about midway of the chassis or frame of the tractor, as to the piston 26 of the hydraulic device, it will be seen that the weight of the loader is distributed throughout the length of the tractor and the main bearing weight of the loading device at the rear end of the cylinder 27 bears upon the draw bar support 29 at the draw bar 31, so that the tractor wheels 15 are maintained in positive engagement with the ground surface to insure proper traction and propulsion of the tractor and loader.

All that is necessary in order to apply this device, is to mount the plates 23 on the side bars of the chassis frame and to mount the cylinder in the proper position at 28, in connection with the extension 30 of the draw bar support 29 and to operatively connect the pump with the power take-off of the tractor. The tractor is operated and controlled in the usual way by the operator from the driver's seat in rear of the steering wheel 14, and it will thus be seen that the device is readily mobile to engage the manure or other material to be loaded and to be dumped into a wagon or manure spreader, or to be transported from a barn to a compost pile outside of the bar at a suitable place accessible for use. The device is strong and efficient, the cylinder supplying the necessary power by the hydraulic pressure of the fluid, such as oil, air or otherwise supplied thereto by the pump operated from the power take-off, and controlled by a valve of a two or three way type indicated at 47, an operating lever 48 adjacent the driver's seat, so as to reverse the operation of the pressure fluid and flow thereof for moving the piston in or out as desired, in order to lower the bucket or to raise the same after being loaded. Obviously, the telescopic action of the arms 37 and the sections thereof will permit the bucket to be held in any desired position when being loaded and raised, so as to retain the load therein, or to permit dumping thereof merely by pulling on the cable 47 to operate the release lever 44 and through the connections or shaft 43 between the latches 42, to readily release the bucket and load to permit the latter to be dumped as desired.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In combination with a tractor including a driver's seat, a chassis frame, front steering wheels, rear traction wheels driven through a transmission and differential, a rear power take-off, and a rear drawbar support, parallel arms disposed longitudinally of and adjacent opposite sides of the forward portion of the tractor and pivoted at their rear ends to the chassis frame forwardly of the rear wheels and rearwardly of the front wheels for vertical swinging movement, said arms projecting forwardly beyond the front of the tractor, a bucket pivotally mounted between the forward ends of said arms to turn forwardly by gravity about a transverse horizontal axis to dumping position, other arms rigid with and extending downwardly from the rear ends of the first-named arms at an obtuse angle to the latter and to points forwardly of the rear wheels, a hydraulic motor for raising and lowering the first-named arms and the bucket disposed longitudinally of and beneath the rear portion of the tractor midway between the sides of the latter, said motor including a cylinder pivoted at its rear end to the drawbar support and a piston rod pivotally connected at its forward end to the lower ends of said other arms, short links pivoted at and extending upwardly from the pivots of the first-named arms, telescopic links connecting the upper ends of said short links to the bucket above the first-named arms, means including latches to hold said telescopic links in collapsed position to keep the bottom of the bucket substantially parallel with the ground, a pull cord connected to said latches for releasing the same from the driver's seat to permit forward turning of the bucket to dumping position when raised with the first-named arms, a pump mounted on the rear of the tractor and operatively connected to the power take-off to supply fluid under pressure for operating said hydraulic motor, means to control the operation of said hydraulic motor from the driver's seat, and vertical guide bars rigidly secured to opposite sides of the chassis frame near the front of the tractor in position for the first-named arms to ride up and down against their outer faces.

ALYERD W. SEVERIN.
MARVIN H. FELDMANN.

REFERENCES CITED

The following references are of record in the file of this patent:

UNITED STATES PATENTS

| Number | Name | Date |
|---|---|---|
| 2,363,986 | Mott | Nov. 28, 1944 |
| 2,377,112 | Strunk | May 29, 1945 |
| 2,398,585 | Hayward | Apr. 16, 1946 |
| 2,419,493 | Hoff | Apr. 22, 1947 |
| 2,426,544 | Wooldridge | Aug. 26, 1947 |